United States Patent
Flynn et al.

(10) Patent No.: US 7,350,394 B1
(45) Date of Patent: Apr. 1, 2008

(54) ZERO-G OFFSET IDENTIFICATION OF AN ACCELEROMETER EMPLOYED IN A HARD DISK DRIVE

(75) Inventors: William Flynn, San Jose, CA (US); Wei Guo, Fremont, CA (US); Mark Heimbaugh, Pleasonton, CA (US); Yunfeng Li, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/292,473

(22) Filed: Dec. 2, 2005

Related U.S. Application Data

(60) Provisional application No. 60/632,915, filed on Dec. 3, 2004, provisional application No. 60/633,052, filed on Dec. 3, 2004.

(51) Int. Cl.
*G01P 21/00* (2006.01)
(52) U.S. Cl. ....................................... 73/1.38
(58) Field of Classification Search ............... 73/1.38
See application file for complete search history.

(56) References Cited

U.S. PATENT DOCUMENTS

| | | | |
|---|---|---|---|
| 4,745,564 A * | 5/1988 | Tennes et al. ............... 702/141 |
| 5,299,075 A * | 3/1994 | Hanks ....................... 360/77.02 |
| RE35,269 E * | 6/1996 | Comerford ................... 360/75 |
| 5,663,847 A * | 9/1997 | Abramovitch ............ 360/77.02 |
| 5,777,815 A * | 7/1998 | Kasiraj et al. ................. 360/75 |
| 5,835,298 A * | 11/1998 | Edgerton et al. ............. 360/75 |
| 5,982,573 A | 11/1999 | Henze |
| 6,101,062 A * | 8/2000 | Jen et al. ...................... 360/75 |
| 6,417,979 B1 * | 7/2002 | Patton et al. .................. 360/75 |
| 2005/0119795 A1 * | 6/2005 | Morisada ..................... 700/280 |
| 2006/0152842 A1 * | 7/2006 | Pasolini et al. ............... 360/75 |

* cited by examiner

*Primary Examiner*—Robert Raevis
(74) *Attorney, Agent, or Firm*—Westman, Champlin & Kelly, P.A.

(57) ABSTRACT

A method is provided for identifying offsets of accelerometers integrated into hard disk drives. More specifically, often, disk drives employ accelerometers that constantly monitor the acceleration felt by the disk drive. Once the accelerations are less than a predetermined threshold, a free fall event is identified and an actuator arm that is generally positioned above the disk is placed in a safe location prior to impact. Accelerometers must be calibrated prior to use such that their inherent errors are identified and factored into the algorithm that identifies free fall. The method provided herein allows for the 0 g offset to be monitored without having to reorient the device being tested, thus saving time and money.

8 Claims, 2 Drawing Sheets

ZERO-G OFFSET IDENTIFICATION OF AN ACCELEROMETER EMPLOYED IN A HARD DISK DRIVE

CROSS-REFERENCE TO RELATED APPLICATIONS

This application claims the benefit of U.S. Provisional Patent Application Ser. No. 60/632,915 and No. 60/633,052 filed Dec. 3, 2004, both of which are incorporated by reference in their entirety herein. This application is also related to U.S. patent application entitled "MOBILE HARD DISK DRIVE FREE FALL DETECTION AND PROTECTION," which is further identified by Ser. No. 11/292,831 filed Dec. 2, 2005, which is incorporated by reference in its entirety herein.

FIELD OF THE INVENTION

The present invention relates generally to disk drives, and more particularly, a method and apparatus for protecting rotating media and read/write heads of the disk drive from mechanical shock events caused by an impact following a fall. More specifically, the present invention repositions the actuator arm off the disk or over a crash zone when free fall and/or tumbling motion is detected.

BACKGROUND OF THE INVENTION

Conventional disk drives employ a servo system that controls the radial position of an actuator arm relative to the surface of a rotating recording disk. The actuator arm supports a read/write head or transducer above a disk surface and ideally over the center of a selected track on the disk surface. For positioning purposes, the read/write head senses servo information embedded in the disk, which is then used to develop a position error signal. The error signal is then used to adjust the position of the read/write head in a direction to reduce the magnitude of the error for purpose of track following. The servo system is also utilized to move the read/write head from one track to another track.

At one time, disk drives were employed primarily within desktop computers, where the disk drives operated in a static environment within the computer on a desktop or table. The computer was in a stable position and there was little likelihood that disk drive would experience shock loading from impacts as a result of being dropped. Today, an increasing percentage of disk drives are being used in portable electronic devices, including laptop computers, notebook computers, palm-held devices, personal digital assistants, music players and other portable electronic devices. A primary problem associated with contemporary designs of such disk drives concerns shock-induced damage from the impact of a falling portable electronic device colliding with a surface. For example, when a device containing a small disk drive falls from a desk or a user's hand onto a hard surface, the shock pulse magnitude generated can be hundreds or thousands times the acceleration of gravity. Shock induced damage to the disk drive or its components is typically less a problem when the portable electronic device is turned off. When turned off, the actuator arm and head element are securely parked at a position off the surface of the disk or on a crash zone on the disk surface. In many cases, the actuator arm may also be latched to further inhibit movement away from the parked position. Therefore, if the portable electronic device is dropped, there is a substantially reduced likelihood that the disk surface and/or head will be damaged. Conversely, if the disk drive is in operation at the time of the fall, the actuator arm is unlatched and the head is likely positioned over the data portion of the disk surface. As a result, damage can easily occur to the disk surface and/or head element.

External shocks such as these yield at least two undesirable outcomes: physical damage of the disk and/or the head and track misregistration. During operation, a shock of sufficient magnitude will cause the head to impact the rotating disk, thereby damaging the magnetic media film, the disk substrate, and/or the head. Further, the shock event generates linear and radial accelerations that apply a moment to the actuator arm. This moment may exceed the ability of the servo system to maintain the read/write head within the allocated tracking error range required for acceptable data integrity, and the servo system may lose track of the actual position of the head element. This problem is exacerbated by increased track density which reduces the acceptable tracking error range. If a shock occurs during the data writing process, the disk drive is in jeopardy of miswriting the data off track, or worse, writing over previously written data on adjacent or nearby tracks.

Thus, it is often advantageous to ensure that the disk drive heads are in a parked position away from the rotating disks prior to impact or positioned over a designated crash zone. In the case of portable computers, this has been accomplished in the past by adding a micro-electro-mechanical-system (MEMS) accelerometer to the computer so that the free fall condition is sensed and the heads are parked prior to impact. For example, some MEMS accelerometers include an outer ring of material that is fixed to a stationary object, such as the motherboard of a computer. A suspended, movable mass is interconnected via a plurality of arms to an inside surface of the outer ring of material. As the MEMS accelerometer is accelerated, inertia causes the resting suspended mass to move relative to the outer ring thereby loading the plurality of arms that connect the mass to the ring. The arms are doped with a piezo-electric material that creates a voltage difference within the arms when loaded. The amount of voltage difference across each of the arms is measured to ultimately yield the magnitude of acceleration. When a disk drive is at rest, for example, sitting on a table, the acceleration measured by the accelerometer is 1 g (where g=force of gravity: 9.8 m/s$^2$). The suspended mass of the MEMS accelerometer will be acted on by gravity and displaced downwardly from the outer ring causing a reading of 1 g acceleration. When the disk drive is dropped, the mass will move relative to the fixed ring, either in line therewith, causing a 0 g acceleration reading, or moving upwardly therefrom, causing a less than 1 g acceleration reading. Thus, when an acceleration indicates less than, or equal to, a predetermined threshold values for a predetermined amount of time, the disk drive is in a free fall condition. Once it is ascertained that the disk drive is indeed experiencing free fall, the voice coil motor that controls the position of the actuator arm is directed to place the actuator arm into a safe location, i.e., to park the actuator arm. When parked, the read/write head or transducer is located away from the rotating disks or over a crash zone so that should the disk drive impact a surface, the head does not strike the disk surface or is already in contact with the surface at a safe zone.

As an alternative, other MEMS accelerometers include a movable mass with a plurality of fingers emanating therefrom that interact with stationary fingers interconnected to a substrate. When at rest, a uniform gap exists between each pair of moveable and stationary fingers. When the mass of the accelerometer moves with respect to the stationary fingers, the gap between each set of fingers is either increased or decreased. The pairs of fingers function as capacitors, altering the space therebetween which changes the capacitance, which, in turn, is measured to identify the magnitude of the acceleration.

The prior art includes the use of accelerometers to detect free fall. U.S. Pat. No. 5,982,573 to Henze ("Henze"), which is incorporated by reference in its entirety herein, discloses a method of sensing acceleration using a MEMS accelerometer and moving the heads away from the disks before an impact occurs. The accelerometer employed is mounted in and secured to the housing of the disk drive. Thus, after a free fall event is detected, a signal is sent from the accelerometer to a processor to cause a signal to be sent to the voice coil motor to park the actuator arm. In other prior art devices, the accelerometer is positioned outside of the disk drive, such as on the motherboard of a computer. In these instances, the command to park the actuator arm must pass through the ATA interface, or similar interface, of the disk drive, and the disk drive must hold the current operation to respond to the command. In each instance, the interface, command, and response time and overhead involved slow or delay any action taken in response to the generated signal. This time lag can be directly correlated to lost reaction time and translates to a minimum drop distance for which corrective action cannot be taken. Conversely, only drops greater than this minimum distance may be detected in time to take corrective action. Unfortunately, even drops less than this minimum distance may produce considerable damage to a disk drive. Moreover, by placing the accelerometer outside of the disk drive, such as on the mother board of a computer, any malfunction of the computer can prevent the signal from the accelerometer from being processed and/or the appropriate corrective signal from reaching the voice coil motor.

Another drawback of the prior art devices and methods for detecting a fall is that they may be fooled into believing that the electronic device is free falling when it is not falling. More specifically, often vibrational loading of the system may be incorrectly identified as a free fall causing an unwanted parking of the head. For example, during travel on a train, airplane, bus or car, or during jogging or dancing, electronic devices are exposed to periodic vibrational accelerations. These vibrations have an extended duration that may cause a detector to falsely conclude a free fall event is occurring and cause the heads to be parked.

In addition to dealing with the effects of vibrations, as well as establishing or tuning the sensitivity of the detection system, inherent errors within an accelerometer must be accounted for. These inherent errors, i.e. "offsets," result from imperfections in materials, manufacturing and processing of the accelerometer, the manner in which the accelerometer is affixed to the disk drive, variations in environmental conditions, such as temperature, and other factors. The aggregate magnitude of the offset may vary from one accelerometer to the next. However, the threshold value used in the detection scheme should account for the largest possible offsets among a population of accelerometers if the offsets are not identified. For example, the accelerometers used in testing and collecting the data in connection with the present invention have an offset up to 0.25 g per axis, wherein the magnitude of the aggregate acceleration is represented by the equation:

$$a = \sqrt{a_x^2 + a_y^2 + a_z^2}$$

These offset numbers should be factored into any threshold used to detect free fall because the magnitude of the offsets is inherent in the accelerometer. For example, with a 0.5 g aggregate acceleration offset, the accelerometer will always record at least 0.5 g even if it is in freefall. Thus, in order to ensure that a fall is detected, the threshold must be set to a value larger than 0.5 g. In a population of accelerometers, some of them may have large offsets, and some of them may have small offsets. Ultimately, the threshold must be artificially increased to account for the worst case offsets; therefore accelerations from vibrations that would not generally be damaging to a disk drive may fall beneath the adjusted threshold value for accelerometers with smaller threshold thereby indicating a fall. If the duration of these accelerations is below the adjusted threshold for a predetermined amount of time, a false indication of free fall will occur.

In order to correctly identify a free fall condition as a predicate, the axis specific offsets must be identified and accounted for in the algorithms that identify the free fall condition. Traditionally this is done by placing a disk drive with interconnected accelerometer on a horizontal hard surface wherein the accelerations in X, Y, and Z directions are measured. In this example, accelerations in the X and Y directions, which are substantially parallel to the measuring table, should be 0, and the acceleration in Z direction should be either plus or minus 1 g, depending on the orientation of the accelerometer. However, often the measured values in each of the three directions are not ideal. For the X and Y directions, the output is the zero gravity offset for these two directions. For the Z direction, the output from the accelerometer is 1 g plus zero gravity offset in the Z direction. The 0 g Z offset is not readily apparent since the orientation of the accelerometer is under an external load of 1 g, not zero gravity. Traditionally, in order to ascertain the 0 g offset in the Z direction, the disk drive must be rotated 90 degrees wherein the X or Y direction is aligned with the acceleration of gravity and the force felt in the Z direction equals 0. The 0 g offset in the Z direction may now be ascertained since, ideally, the amount of acceleration felt in the Z direction should be 0. The drawback of this calibration method is that additional equipment and processes in the assembly line are required to repeatedly rotate the disk drive 90 degrees. Further, additional handling of the disk drive inevitably leads to increased damage.

Thus, it is a long felt need in the field of disk drive protection to provide a method of more accurately detecting free fall so that the head can be parked prior to impact. There is also a need to more quickly determine if a disk drive is in free fall in order to reduce the height from which corrective action may be taken. In addition, a system is needed that allows for innocuous vibrations to be disregarded thereby preventing false indicators of a free fall event. These needs are very dependent on the accuracy of the sensors employed. So it is yet another long felt need to provide a more cost effective method of calibrating the zero-g offset of accelerometers used to detect free fall that also increases their accuracy.

SUMMARY OF THE INVENTION

It is one aspect of the present invention to provide a method for identifying offsets, i.e. inherent errors of an accelerometer generally employed in disk drives that are used to detect a free fall condition. More specifically, often disk drives employ a three-axis accelerometer to sense the accelerations felt by the disk drive. Once the aggregate acceleration falls below a predetermined threshold for a predetermined amount of time, the system begins a shut down sequence wherein an actuator arm and head are placed in a secure location. Thus, when an impact does occur, no appreciable damage will occur to the head or the spinning disk. In order to set the threshold, the axis-specific offsets of the accelerometers must be identified and accounted for. More specifically, often factors related to the placement of the accelerometer, the type of the accelerometer, the environment, the manner in which the accelerometer is attached to an underlying structure, and other factors affect the voltage outputted by the accelerometer. Thus, an accelerometer sitting on a table horizontally should read an output voltage that coincides with 0 g, in two directions and approximately plus or minus 1 g in the third direction. Often however, in this situation, some amount of voltage will be sensed that indicates that there is an acceleration being felt by the accelerometer in a given direction despite the fact that the accelerometer is stationary.

Since the offset influences the readings of actual acceleration, the aggregate offset must be added to the threshold to ensure that the algorithm used to determine whether or not a freefall event is occurring. For example, if the aggregate offset is 0.5 g, the threshold must be adjusted by this value.

It is desirable to have the most accurate threshold possible. Artificially high thresholds will tend to incorrectly park the actuator head when the disk drive is exposed to non-harmful vibrations, for example, when the disk drive is exposed to a periodic vibration of sufficient magnitude that are below the adjusted thresholds for a predetermined amount of time. False indicators of free fall are annoying and may affect the performance of the disk drive. By ensuring that the correct threshold is used, false indications of free fall will be minimized. In addition, by ensuring that the offset value is not artificially high, reliability in the system is increased, that is, drops will be quickly identified and the actuator arm and head will be timely secured.

Thus, as briefly mentioned above, it is one aspect of the present invention to provide a method for efficiently identifying the axis-specific offsets of an accelerometer and incorporating those into a system for detecting freefalls of a disk drive. In one embodiment of the present invention, a disk drive employing an accelerometer is placed horizontally upon a test table where the acceleration in the X and Y directions, i.e. the horizontal directions, should ideally be 0 g and the acceleration in the Z direction, i.e. vertical, should be 1 g. Of course, it should be understood that the orientation could be changed such that any two of the three axes are positioned to output a zero gravity signal, and the third axis is 1 g. In general terms, the accelerometer has a built-in gain such that a specific amount of sensed acceleration will be outputted as a voltage. Thus, the accelerations in the X, Y and Z directions are measured by the accelerometer, which translates the loads associated with the accelerations into analog voltages. Analog voltages are fed to an analog to digital (A/D) converter that changes the analog signal into a digital signal or a "count" in the X, Y, and Z directions. The digital count corresponds to the analog voltage output by the accelerometer. More specifically, a predetermined number or range of counts corresponds to a specific voltage range. For example, the range of zero to one volt corresponds to a range of zero to 200 counts. As a result, a 0.5 voltage will be 100 counts. The larger the range of counts that is used results in a more precise conversion from the analog signal to the digital signal. Accordingly, each accelerometer is tested, counts in the X, Y, and Z direction are separately noted and the amount offsets in the zero gravity directions, i.e., two of the axes, are determined directly. The amount of offset in the 1 g direction, i.e., the remaining axis, can be estimated by subtracting the 1 g acceleration reading by the nominal count correspond to 1 g acceleration if the gain of the accelerometer is accurate.

The following example is provided for illustration. During a test wherein the X and Y axes of the accelerometer are aligned with a horizontal plane, the X and Y accelerations should ideally be 0 and the output of 0 volts should be received from the accelerometer in those two directions. However, in this example, a voltage is output from the accelerometer. Those two signals are then converted by the A/D converter into digital counts. For this example, 10 counts and 15 counts are outputted from the A/D converter, respectively. Thus, the X and Y 0 g offsets are 10 and 15 counts, respectively. In the Z direction 220 counts are read, wherein 200 counts equals the 1 g acceleration of gravity. Thus, the 0 g offset is 20 counts in the Z direction. These values are used to adjust the measured acceleration such that during a free fall event, the algorithm adds or subtracts the 10, 15 and 20 counts, respectively from the A/D converter reading in the X, Y and Z directions.

It is also an aspect of the present invention to use the 1 g acceleration reading in the Z direction to estimate 0 g offset in the Z direction. More specifically, instead of repositioning the disk drive such that the Z axis is in a horizontal plane and would ideally indicate 0 g, the 1 g acceleration of gravity reading is used to estimate the zero gravity situation. While this method will include some discrepancies and variations due to error in the gain of the accelerometer, it is verified that the gain variations are much smaller than the offset variations in the z-axis for the accelerometer used in the present invention, and these discrepancies or variations are acceptable and do not hinder performance of the system. Therefore, using the foregoing example, the zero gravity offset in the Z direction will be estimated as 20 counts. This method has the advantage of omitting steps in the manufacturing process that are costly and time consuming. Once all of the 0 g offsets, i.e. counts are determined, they are then added to or subtracted from acceleration reading from the A/D converter prior to total acceleration being calculated and compared to the threshold of the free fall algorithm.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings. For example, it should be appreciated that the specific reference to X, Y and Z axes used herein is for exemplary purposes and is not intended as a limitation. One of skill in the art will recognize that the accelerometer need only be positioned in a known orientation such that two axes are subject to a zero gravity condition and one axis is subject to a one gravity condition.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 1:
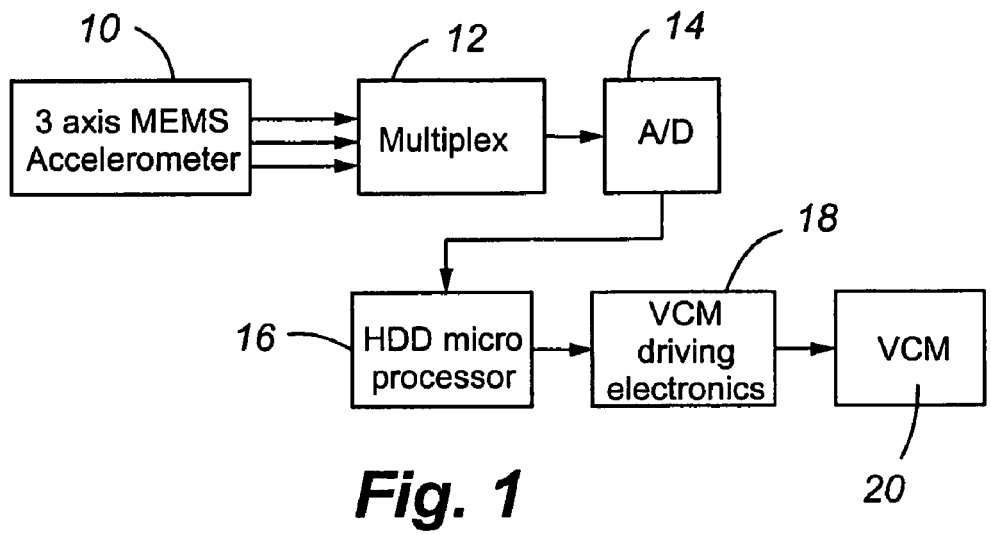
FIG. 1 is a block diagram of the method of measuring accelerations of one embodiment of the present invention.

Referring now to FIG. 1, a block diagram illustrating a free fall detection/protection system is shown. This method is more fully described in co-pending patent application Ser. No. 11/292,831 entitled Mobile Hard Disk Drive Free Fall Detection and Protection, which is incorporated herein in its entirety. More specifically, a three-axis micro-electro-mechanical system accelerometer (MEMS) 10 is provided along with a multiplexer 12 and an analog to digital (A/D) converter 14. The three axis MEMS accelerometer 10 is designed to sense free fall acceleration in the X, Y, and Z directions and to feed the converted voltage into the multiplexer 12. The output voltage from the multiplexer 14 is then fed into the A/D converter 14 and then fed to a microprocessor 16. If the amount of acceleration exceeds a predetermined threshold, the microprocessor 16 directs a signal to the voice coil motor (VCM) driver electronics 18 instructing the VCM driver electronics to power the voice coil motor 20 to move the actuator assembly to a safe location, thereby protecting the disk and head should impact occur.

Figure 2:
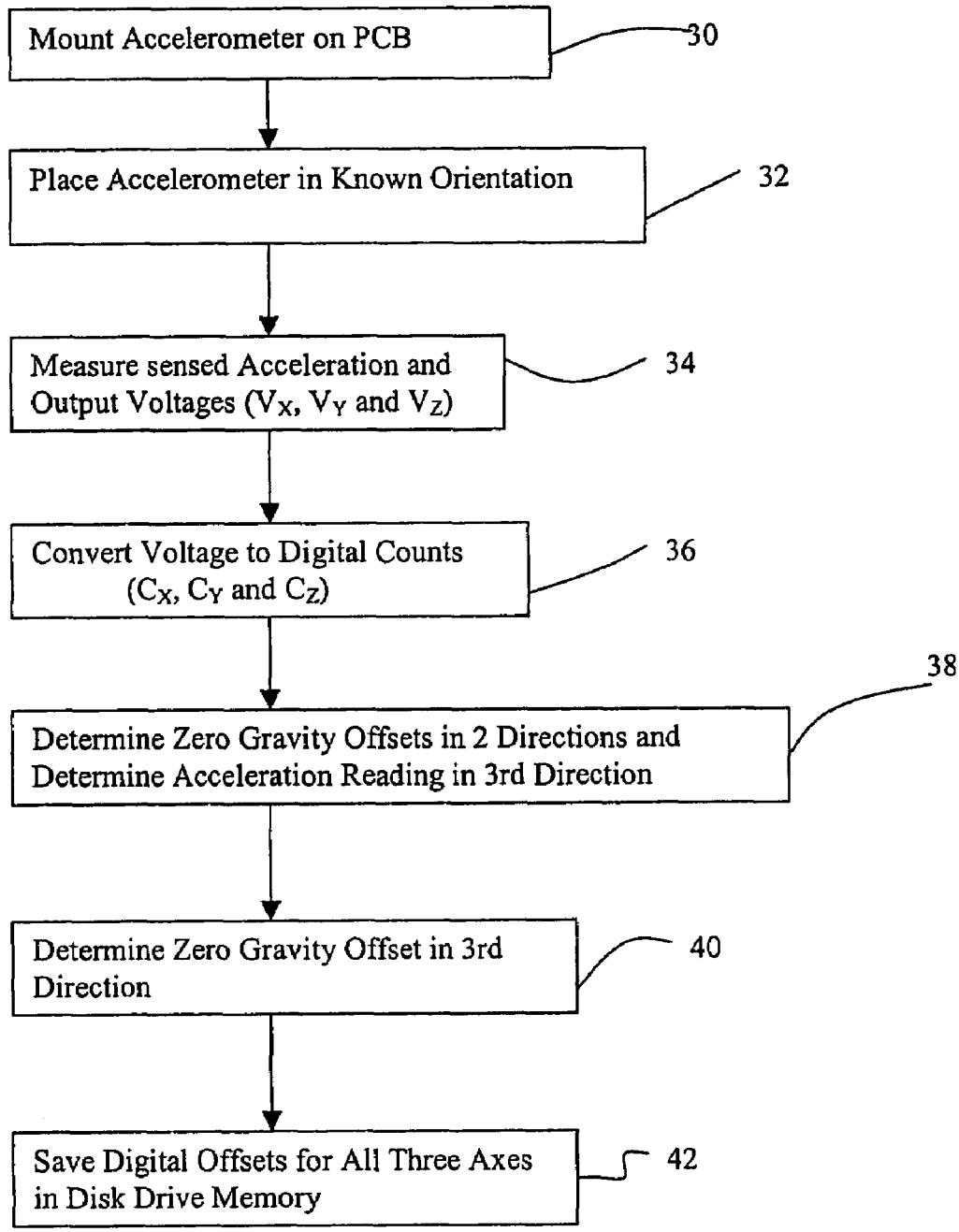
FIG. 2 is a block diagram illustrating the method of estimating the offsets.

The present invention employs a method of identifying inherent errors of a three-axis accelerometer, i.e. offsets in the X, Y, and Z direction. The offsets are then used to adjust the acceleration reading in the disk drive free fall detection system during normal operation for purposes of more accurately assessing the occurrence of a free fall event. FIG. 2 is a block diagram of one method of the present invention. At step 30, an accelerometer 10 is attached to a printed circuit board of a disk drive as part of the disk drive manufacturing process. At step 32, as a further part of the manufacturing process, the combined printed circuit board and accelerometer are placed in a known orientation for purposes of assessing offsets in the output of the accelerometer under zero gravity conditions. For example, the printed circuit board and accelerometer are positioned such that two of the three axes are horizontally positioned and one is vertically positioned. For purposes of this description, the X and Y axes of the accelerometer are horizontally positioned and the Z axis is vertically positioned. Nonetheless, it should be appreciated that the vertically positioned axis can be any of the three. At step 34, sensed accelerations are assessed in X, Y and Z directions. The accelerometer 10 converts the sensed acceleration into voltages V, with separate components for the X, Y and Z directions, $V_X$, $V_Y$ and $V_Z$, respectively. At step 36, the component voltages V are then sent through an A/D converter 12 that turns each analog voltage signal into corresponding digital counts, $C_X$, $C_Y$ and $C_Z$, respectively. The counts are determined based upon a predetermined conversion factor that is stored within the A/D converter 30. The A/D converter converts the voltage readings into a digital form. In particular, the A/D converter includes a conversion table containing a range of digital counts that correspond to a range of voltages. For example, a range of counts, perhaps 0 to 200, is assigned to correspond to a range of voltages, such as 0 to 1 volts. Accordingly, a zero voltage reading that enters the A/D converter exits as a 0 count output, a one volt reading generates a 200 count output, and a 0.25 volt reading would generate a 50 count output. The range of counts and corresponding range of voltages can be adjusted to make the analog to digital conversion more or less accurate. For example, 1000 counts could be used instead of 200 and the conversion would be more accurate.

Ideally, the horizontally disposed axes, X and Y, would output 0 volts and 0 counts. Similarly, the vertically disposed axis, Z, should output 1 volt and 200 counts. However, this is typically not the case. Generally, inherent errors in the accelerometer 10 yield voltages and corresponding counts in the X and Y direction that are not 0, and in the Z direction, that do not coincide with a 1 g reading. It is also important to note that, depending on the frame of reference, the output of the accelerometer 10 may be positive or negative, wherein their corresponding voltages and counts are positive or negative.

For purposes of further explanation and illustration offset readings will be assumed. Therefore, it is assumed the output of the A/D converter is 10 counts in the X direction, 15 counts in the Y direction, and 220 counts in the Z direction. Thus, at step 38, it would be known that the 0 g offset in the X direction is 10 counts, the 0 g offset in the Y direction is 15 counts and the 1 g acceleration reading in the Z direction is 220 counts. However, the purpose of the assessment is to determine zero gravity offsets in all three directions. The reading for the Z direction is based upon a 1 g condition, not a 0 g condition. According to prior art methods, the disk drive must be turned on its side and the Z direction be placed horizontally in order to assess the zero-gravity condition. To avoid the cost and time to undertake the reorientation of the disk drive, one embodiment of the present invention uses the 1 g Z direction assessment to obtain an estimate of the 0 g offset for the Z direction. Thus, at step 40, the 0 g offset in the Z direction is determined to be at 20 counts. This value is acquired by subtracting normal 1 g acceleration count value (200 in this example) from the acceleration reading obtained in step 38 for the Z direction (220-200). At step 42, the digital offsets $C_x$, $C_y$ and $C_z$ are stored in the memory of the disk drive. Thus, assessment and calibration is done as part of the manufacturing process for each disk drive.

Referring back to FIG. 1, use of the offsets during free fall detection is explained. The accelerations in each direction, $A_X$, $A_Y$ and $A_Z$ are sensed by the accelerometer 10. The accelerometer 10 then outputs a voltage V in the X, Y and Z directions, which are then sent through the multiplexer 12 and the A/D converter 14 that turns each analog voltage signal into corresponding digital counts. The digital counts acceleration readings are then adjusted by the stored offsets prior to calculating total acceleration. An adjusted total acceleration is then compared with the threshold.

Figure 3:
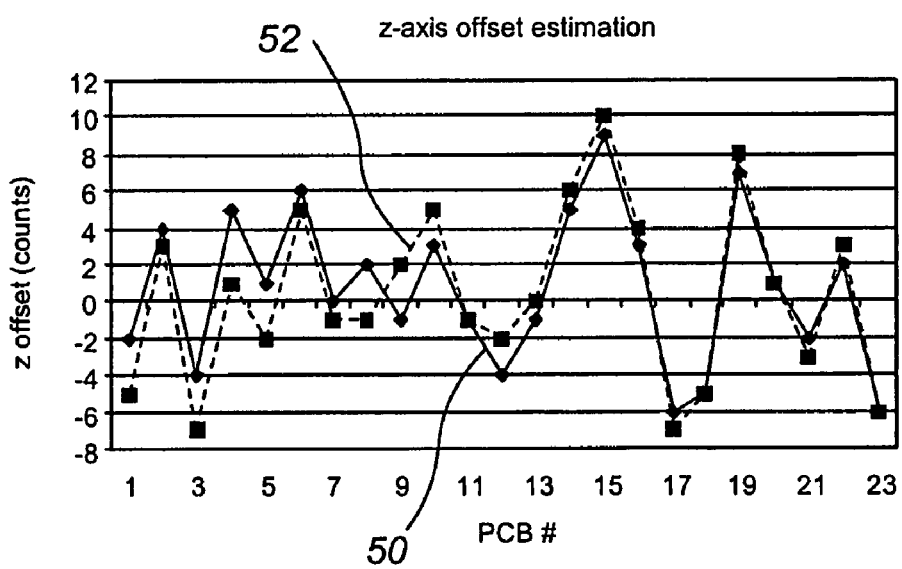
FIG. 3 shows a comparison of the estimated and measured 0 g offsets in the Z direction.

Referring now to FIG. 3, a graph is shown wherein a plot of actually measured 0 g Z offsets 50 (solid line) are compared with estimated 0 g Z offsets 52 (dashed line) based on the 1 g measurements describe above. The comparison illustrates the accuracy of the method of one embodiment of the present invention. More specifically, the 0 g Z direction offset 50 was measured by placing the disk drive in a test apparatus such that the Z direction was horizontal, i.e., at a 0 g location. This measurement was taken for 23 separate accelerometers integrated into 23 separate disk drives. Also shown in FIG. 3 are estimated offsets 52 that are obtained by subtracting the 1 g acceleration nominal digital counts from acceleration reading in Z-direction. It is readily observed that there is a good correlation between the measured and estimated values and that the method of the present invention can be used to obtain offset information in a simplified and more cost effective manner and that provides acceptable performance with respect to detection of free fall events.

While various embodiment of the present invention have been described in detail, it is apparent that modifications and alterations of those embodiments will occur to those skilled in the art. However, it is to be expressly understood that such modifications and alterations are within the scope and spirit of the present invention, as set forth in the following claims.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While various embodiment of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A method of manufacturing a disk drive, comprising:
   obtaining the output of an accelerometer mounted on a printed circuit board of a disk drive, the output having a component corresponding to each of three mutually orthogonal axes including a vertical axis oriented vertically to experience a 1 G acceleration due to gravity;
   converting each of the three component outputs into a digital format;
   determining if an offset exists in the output of the accelerometer in each of the three mutually orthogonal axes, and determining the offset for the vertical axis relative to a normal 1 G acceleration value for the type of accelerometer mounted on the printed circuit board;
   adjusting the accelerometer output reading from each of the three mutually orthogonal axes to add or subtract the offset for each of the three mutually orthogonal axes in subsequent outputs independent of the orientation of the accelerometer; and
   placing the accelerometer in a hard disk drive.

2. The method of claim 1, wherein the accelerometer is placed in the disk drive prior to it being adjusted.

3. The method of claim 1, wherein the accelerometer is placed in the disk drive after it is adjusted.

4. The method of claim 1, wherein obtaining the output of an accelerometer comprises obtaining three voltage signals, one corresponding to each of the three mutually orthogonal axes.

5. The method of claim 4, wherein converting each of the three component outputs into a digital format comprises converting the three voltage signals into three digital count values.

6. The method of claim 5, further comprising determining three offset values corresponding to the three mutually orthogonal axes from the digital count values.

7. The method of claim 5, wherein the three digital count values are obtained from an analog to digital converter.

8. The method of claim 1, wherein the position of the accelerometer is not changed during the step of obtaining the output of the accelerometer.

* * * * *